United States Patent
Mori

(10) Patent No.: US 11,355,860 B2
(45) Date of Patent: Jun. 7, 2022

(54) ANTENNA DEVICE

(71) Applicant: KABUSHIKI KAISHA TOSHIBA, Tokyo (JP)

(72) Inventor: Hiroki Mori, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 77 days.

(21) Appl. No.: 17/016,237

(22) Filed: Sep. 9, 2020

(65) Prior Publication Data

US 2021/0296782 A1    Sep. 23, 2021

(30) Foreign Application Priority Data

Mar. 19, 2020  (JP) .............................. JP2020-049130

(51) Int. Cl.
| | |
|---|---|
| *H01Q 21/00* | (2006.01) |
| *G01S 13/00* | (2006.01) |
| *G01S 13/06* | (2006.01) |
| *H01Q 21/22* | (2006.01) |

(Continued)

(52) U.S. Cl.
CPC ......... *H01Q 21/0025* (2013.01); *G01S 7/032* (2013.01); *G01S 13/06* (2013.01);
(Continued)

(58) Field of Classification Search
CPC .......... G01S 13/04; G01S 13/06; G01S 13/48; G01S 13/584; G01S 13/426; G01S 13/867; G01S 13/887; G01S 2013/0245; G01S 2013/0254; G01S 13/42; H01Q 21/065; H01Q 21/0025; H01Q 21/061;
(Continued)

(56) References Cited

U.S. PATENT DOCUMENTS

| | | | |
|---|---|---|---|
| 8,395,552 B2 * | 3/2013 | Geiler .................. | H01Q 15/008 |
| | | | 343/700 MS |
| 10,680,344 B2 * | 6/2020 | Murata .................. | H01Q 21/28 |

(Continued)

FOREIGN PATENT DOCUMENTS

| | | | | |
|---|---|---|---|---|
| CN | 108120957 A | * | 6/2018 | ............... G01S 7/03 |
| CN | 106019238 B | * | 12/2020 | ......... G01S 13/4463 |

(Continued)

OTHER PUBLICATIONS

MIMO Radar with Widely Separated Antennas—From Concepts to Designs—Chapter 13. Qian He et al. (Year: 2014).*

(Continued)

*Primary Examiner* — Vibol Tan
(74) *Attorney, Agent, or Firm* — Holtz, Holtz & Volek PC

(57) ABSTRACT

According to one embodiment, an antenna device includes a first transmission array antenna including transmission antennas of a first number, arranged with a first distance in a first direction, a first reception array antenna including reception antennas of a second number, arranged with a second distance in a first direction or a second direction which is parallel to the first direction, a second transmission array antenna including transmission antennas of a third number, arranged with the first distance in the first direction, and a second reception array antenna including reception antennas of a fourth number, arranged with the second distance in the first direction or the second direction.

17 Claims, 9 Drawing Sheets

(51) Int. Cl.
    *G01S 7/03*     (2006.01)
    *H01Q 21/06*    (2006.01)
    *G01S 13/86*    (2006.01)
    *G01S 13/88*    (2006.01)

(52) U.S. Cl.
    CPC .......... *G01S 13/867* (2013.01); *G01S 13/887* (2013.01); *H01Q 21/061* (2013.01); *H01Q 21/065* (2013.01); *H01Q 21/22* (2013.01)

(58) Field of Classification Search
    CPC .... H01Q 21/22; G06V 20/52; G06V 2201/05; G06V 2201/07
    See application file for complete search history.

(56) References Cited

U.S. PATENT DOCUMENTS

| | | | | |
|---|---|---|---|---|
| 10,992,053 | B2* | 4/2021 | Izadian | H01P 11/002 |
| 11,041,941 | B2* | 6/2021 | Rajendran | G01S 7/4026 |
| 11,079,485 | B2* | 8/2021 | Aoki | G01S 7/03 |
| 2019/0004171 | A1* | 1/2019 | Qi | G01S 13/89 |
| 2020/0161775 | A1* | 5/2020 | Zhu | H01Q 3/247 |
| 2021/0239821 | A1* | 8/2021 | Vollbracht | G01S 13/878 |

FOREIGN PATENT DOCUMENTS

| | | | |
|---|---|---|---|
| JP | 2018169208 A | * | 11/2018 |
| JP | 2018169208 A | | 11/2018 |
| JP | 2018170571 A | * | 11/2018 |
| JP | 2019071510 A | * | 5/2019 |

OTHER PUBLICATIONS

Signal Processing Algorithms for MIMO Radar Thesis by Chun-Yang Chen. California Institute of Technology Pasadena, California (Year: 2009).*

MIMO Radar: An Idea Whose Time Has Come. Eran Fishlert et al. (Year: 2004).*

U.S. Appl. No. 16/807,354; First Named Inventor: Haruka Obata; Title: "System and Inspection Method"; filed Mar. 3, 2020.

U.S. Appl. No. 17/016,967; First Named Inventor: Hiroki Mori; Title: "Radar Apparatus, and Transmission and Reception Method"; filed Sep. 10, 2020.

Li, et al., "MIMO Radar: Concepts, Performance Enhancements, and Applications", in MIMO Radar Signal Processing, 2009, pp. 74-77.

* cited by examiner

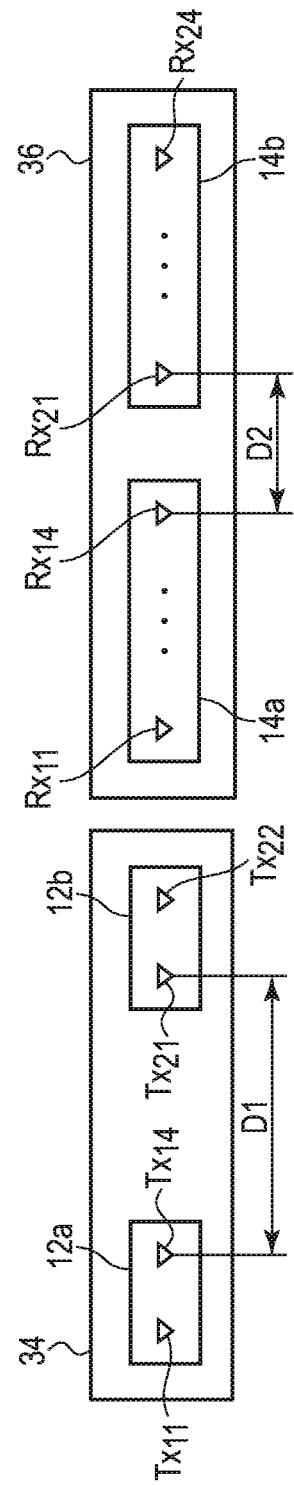
F I G. 3

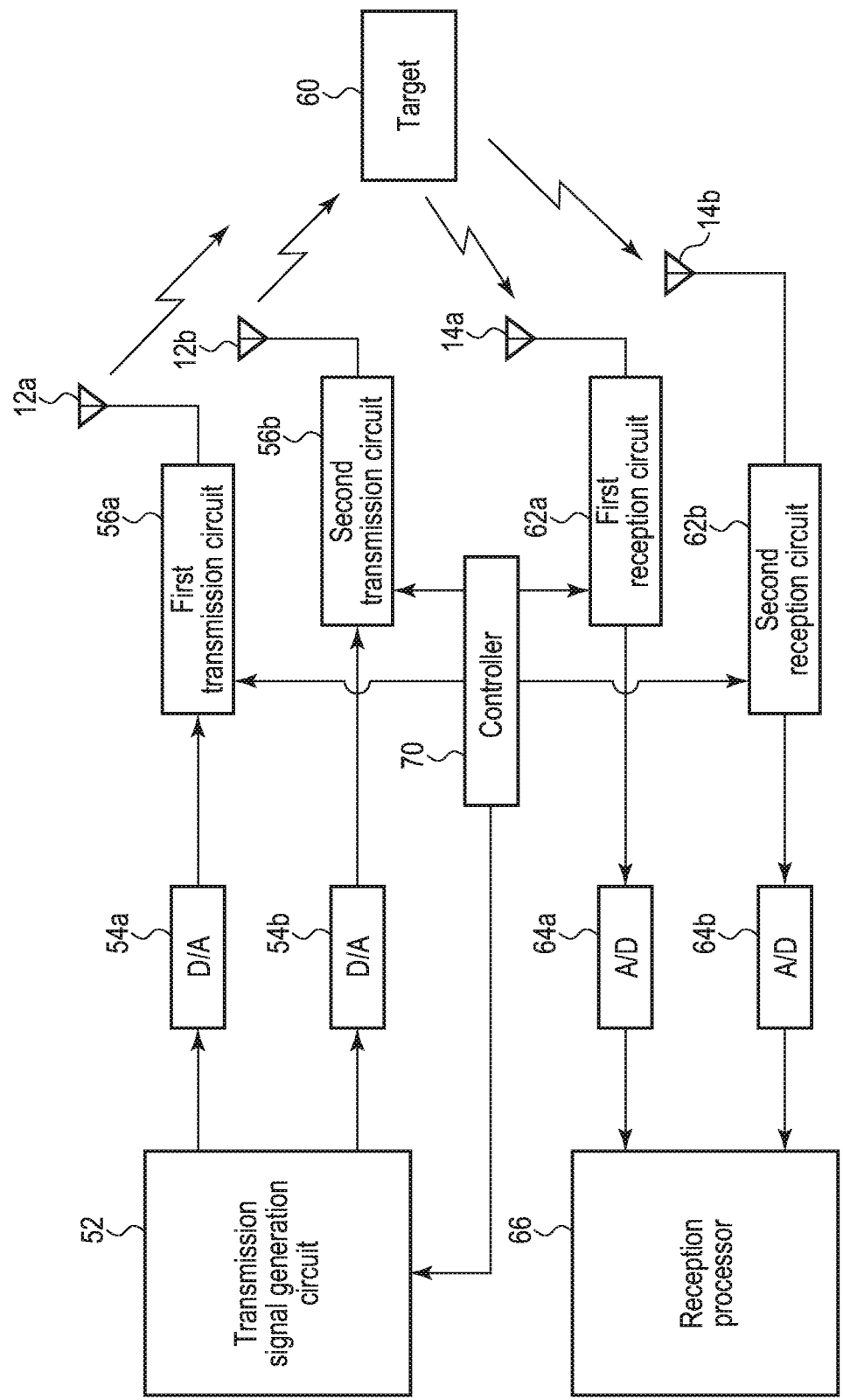
F I G. 4

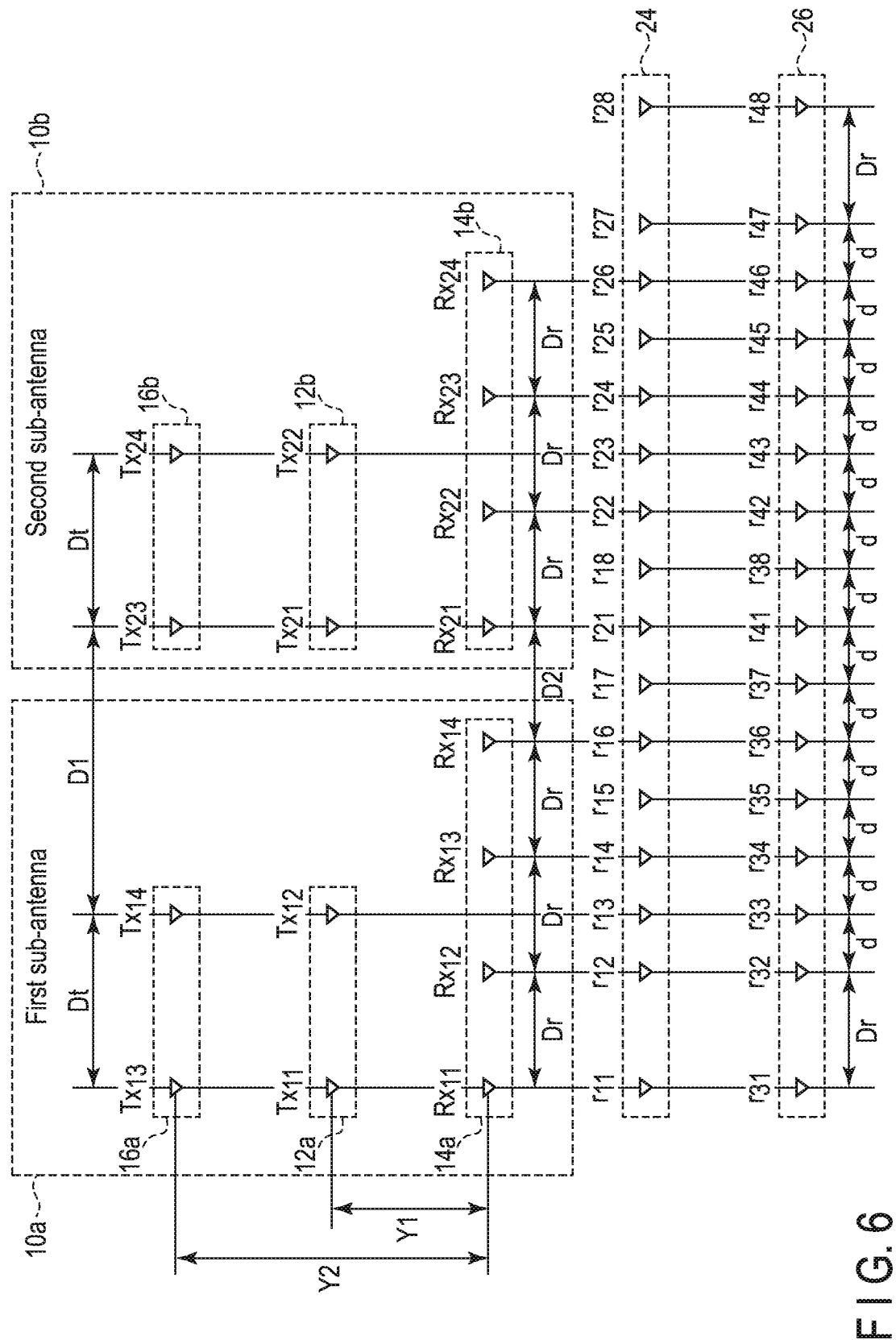
F I G. 6

ANTENNA DEVICE

CROSS-REFERENCE TO RELATED APPLICATIONS

This application is based upon and claims the benefit of priority from Japanese Patent Application No. 2020-049130, filed Mar. 19, 2020, the entire contents of which are incorporated herein by reference.

FIELD

Embodiments described herein relate generally to an antenna device for forming a MIMO (Multi-input Multi-output) array antenna.

BACKGROUND

Radar systems for direction estimation of a target must exert good angular resolution. In order to improve the angular resolution of the radar system, the antenna aperture needs to be widened. The antenna aperture depends on the number of antennas. To widen the antenna aperture, the number of antennas may be increased. Increasing the number of antennas is limited by cost and location factors.

Instead of actually increasing the number of antennas, a MIMO array antenna has been developed.

BRIEF DESCRIPTION OF THE DRAWINGS

FIG. 3 illustrates another example of the arrangement of the antenna device according to the first embodiment.

FIG. 4 is a block diagram of an example of a circuit configuration of the antenna device according to the first embodiment.

FIG. 6 is an example of an antenna device according to a second embodiment.

DETAILED DESCRIPTION

Figure 1:
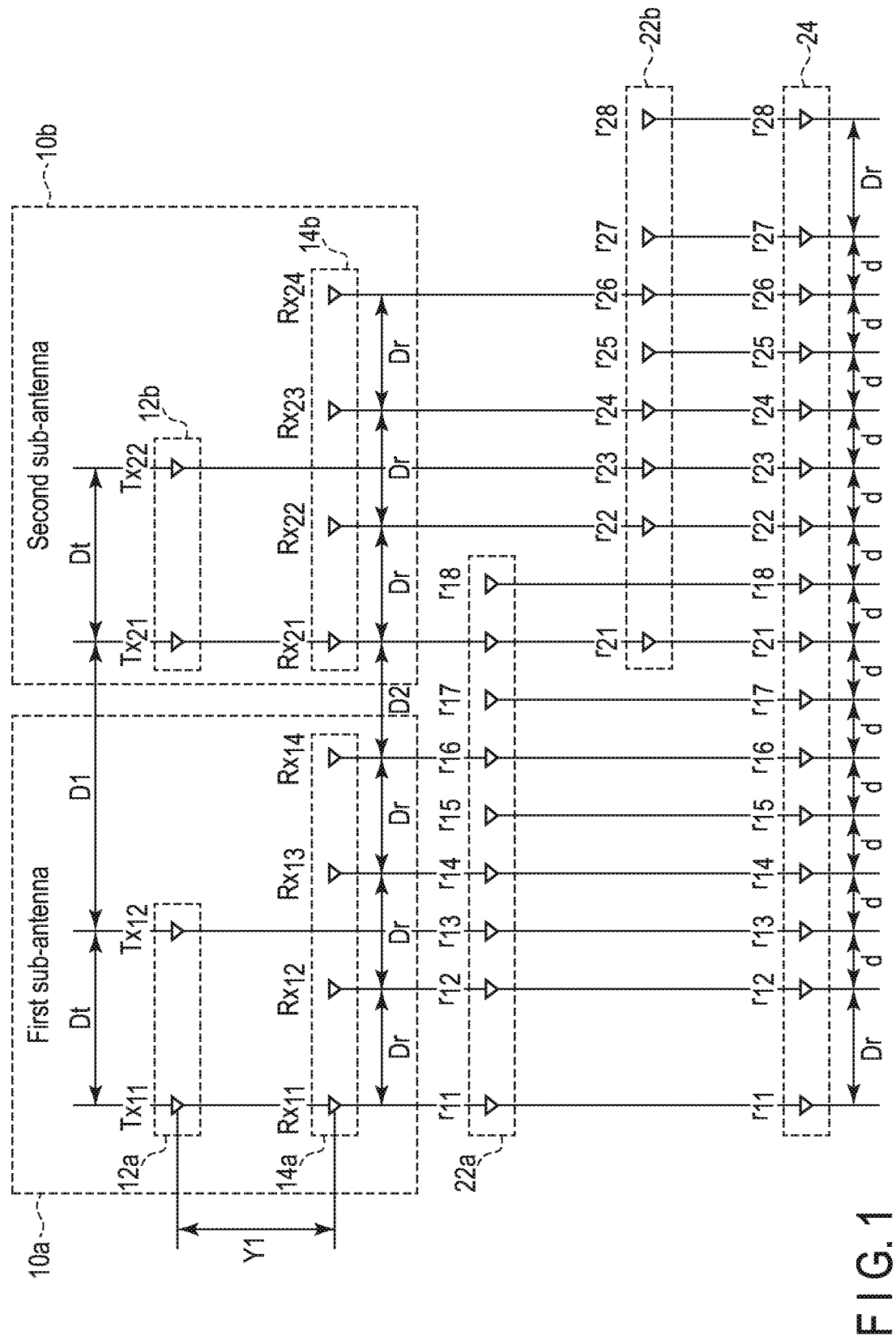
FIG. 1 illustrates an example of an antenna device according to a first embodiment.

The embodiments will be described below with reference to the accompanying drawings. The following description is an example of an apparatus or method for embodying a technical idea of an embodiment. The technical philosophy of the embodiment is not limited to the structure, shape, arrangement, materials, etc., of the components described below. Variations that are readily apparent to those skilled in the art are naturally included within the scope of the disclosure. For the sake of clarity, the drawings show the size, thickness, flat dimensions or shape of each element as actual The drawings may be modified and schematically represented against the implementation of the In more than one drawing, elements may be included that have different dimensional relationships and proportions to each other. In multiple drawings, corresponding elements may be marked with the same reference numeral, to omit duplicate explanations. Some elements may be referred to by multiple names. Although some elements may be given multiple designations, these designations are for illustrative purposes only. These elements may be called by other names. This does not preclude giving other names to these elements even if they are not given multiple designations. In the following explanation, "connection" means not only direct connection but also connection through other elements, for example.

In general, according to one embodiment, an antenna device includes a first transmission array antenna including first transmission antennas of a first number, each of the first transmission antennas arranged with a first distance in a first direction; a first reception array antenna including first reception antennas of a second number, each of the first reception antennas arranged with a second distance in a first direction or a second direction which is parallel to the first direction; a second transmission array antenna including second transmission antennas of a third number, each of the second transmission antennas arranged with the first distance in the first direction; and a second reception array antenna including second reception antennas of a fourth number, each of the second reception antennas arranged with the second distance in the first direction or the second direction. A third distance between one of the first reception antennas which is closest to the second reception array antenna and one of the second transmission antennas which is closest to the first transmission array antenna is less than a fourth distance between one of the second reception antennas which is closest to the first reception array antenna and one of the first transmission antennas which is closest to the second transmission array antenna. An approximately half-wavelength is d. The first distance is Dt which is an integer multiple of two or more of the approximately half-wavelength. The first number is Nt1. The second distance is Dr which is an integer multiple of two or more of the approximately half-wavelength. The second number is Nr1. A fifth distance between one of the first transmission antennas which is closest to the second transmission array antenna and one of the second transmission antennas which is closest to the first transmission array antenna is $Dr \times (Nr1-1)-d$ when $(Nt1-1) \times Dt \leq (Nr1-1) \times Dr$. A sixth distance between one of the first reception antennas which is closest to the second reception array antenna and one of the second reception antennas which is closest to the first reception array antenna is $Dr \times (Nt1-1)-d$ when $(Nt1-1) \times Dt > (Nr1-1) \times Dr$.

First Embodiment

FIG. 1 shows an example of an antenna device according to a first embodiment. As an embodiment, an antenna device used in a radar system will be described. The radar system transmits radio waves to a target, receives the radio waves reflected at the target, and estimates the direction of a target.

The antenna device includes a first sub-antenna $10a$ and a second sub-antenna $10b$.

The first sub-antenna $10a$ includes a first transmission array antenna $12a$ and a first reception array antenna $14a$. The second sub-antenna $10b$ includes a second transmission array antenna $12b$ and a second reception array antenna $14b$.

The first transmission array antenna $12a$ is a linear array antenna including first transmission antennas $Tx_{11}$ and $Tx_{12}$ of a first number Nt1. The first transmission antennas $Tx_{11}$ and $Tx_{12}$ arranged with a first distance Dt in a first direction. The first direction is, for example, along the X-axis. The first distance Dt is an integer multiple of two or more of an approximately half-wavelength $d(\approx\lambda/2)$ or the highest intensity wave contained in the radio waves transmitted from the transmission antenna and received by the reception antenna. It is, for example, 3d. The first number Nt1 is, for example, two.

Since the transmission antenna and the reception antenna are interchangeable, in the following description, the transmission antenna may be referred to as the reception antenna and the reception antenna may be referred to as the transmission antenna. Similarly, the transmission array antenna may be referred to as the reception array antenna, and the reception array antenna may be referred to as the transmission array antenna.

The first reception array antenna 14a is a linear array antenna including first reception antennas $Rx_{11}$, $Rx_{12}$, $Rx_{13}$, and $Rx_{14}$ of a second number Nr1. Each of the first reception antennas $Rx_{11}$, $Rx_{12}$, $Rx_{13}$, and $Rx_{14}$ is arranged with a second distance Dr in the second direction. The second direction is parallel to the first direction. The second direction is, for example, along the X-axis. The second distance Dr is an integer multiple of two or more of the approximately half-wavelength d, e.g., 2d. The second number Nr1 is, for example, four. When one of the first distance Dt and the second distance Dr is an odd multiple of the approximately half-wavelength d, the other one may be an even multiple of the approximately half-wavelength d. The approximately half-wavelength means, for example, a wavelength that is within ±30%, ±20%, or ±10% of the half-wavelength.

In FIG. 1, a straight line is drawn between the leftmost first transmission antenna $Tx_{11}$ in the first transmission array antenna 12a and the leftmost first reception antenna $Rx_{11}$ in the first reception array antenna 14a. The straight line indicates a phase, not a physical location. The phase of the radio waves transmitted from the leftmost first transmission antenna $Tx_{11}$ corresponds to the phase of the radio waves received by the leftmost first reception antenna $Rx_{11}$.

The second transmission array antenna 12b is a linear array antenna including transmission antennas $Tx_{21}$ and $Tx_{22}$ of a third number Nt2. The transmission antennas $Tx_{21}$ and $Tx_{22}$ are arranged with the first distance Dt in the first direction. That is, the first transmission antennas $Tx_{11}$ and $Tx_{12}$ and the second transmission antennas $Tx_{21}$ and $Tx_{22}$ arranged in the same direction. The third number Nt2 is, for example, two. According to the example of FIG. 1, the first number Nt1 and the third number Nt2 are equal, but they may be different.

The second reception array antenna 14b is a linear array antenna including the reception antennas $Rx_{21}$, $Rx_{22}$, $Rx_{23}$, and $Rx_{24}$ of a fourth number Nr2. Each of the reception antennas $Rx_{21}$, $Rx_{22}$, $Rx_{23}$, and $Rx_{24}$ is arranged with the second distance Dr in the second direction. That is, the first reception antenna $Rx_{11}$, $Rx_{12}$, $Rx_{13}$, $Rx_{14}$, and the second reception antenna $Rx_{21}$, $Rx_{22}$, $Rx_{23}$, and $Rx_{24}$ are arranged in the same direction. The fourth number Nr2 is, for example, four. According to the example of FIG. 1, the second number Nr1 and the fourth number Nr2 are equal, but they may be different. The first transmission array antenna 12a and the second transmission array antenna 12b are aligned on a straight line in the first direction. The first reception array antenna 14a and the second reception array antenna 14b are aligned on the second straight line in the second direction. The first straight line and the second straight line are separated from each other by a distance Y1 in the Y-axis direction perpendicular to the X-axis.

In FIG. 1, a straight line is drawn between the leftmost second transmission antenna $Tx_{21}$ of the second transmission array antenna 12b and the leftmost second reception antenna $Rx_{21}$ the second reception array antenna 14b. The straight line indicates a phase, not a physical location. The phase of the radio waves transmitted from the leftmost first transmission antenna $Tx_{21}$ corresponds to the phase of the radio waves received by the leftmost first reception antenna $Rx_{21}$.

At the first sub-antenna 10a, radio waves transmitted from the transmission antenna $Tx_{11}$ and reflected at the target are received by the reception antennas $Rx_{11}$, $Rx_{12}$, $Rx_{13}$, and $Rx_{14}$, MIMO antennas r11, r12, r14, and r16 are formed in the direction along the X-axis at the second distance Dr. The phase of the MIMO antenna r11 corresponds to the phase of the transmission antenna $Tx_{11}$.

Similarly, when the radio waves transmitted from the transmission antenna $Tx_{12}$ and reflected at the target are received by the reception antenna $Rx_{11}$, $Rx_{12}$, $Rx_{13}$, $Rx_{14}$, MIMO antennas $r_{13}$, $r_{15}$, $r_{17}$, and $r_{18}$, are formed in the direction along the X-axis at the second distance Dr. The phase of the MIMO antenna $r_{13}$ corresponds to the phase of the transmission antenna $Tx_{12}$. The transmission antennas $Tx_{11}$ and $Tx_{12}$ may be driven in a time-division manner and transmit two radio waves corresponding to two transmission signals at different times. The time-division drive avoids interference between the two transmission signals. Alternatively, the transmission antennas $Tx_{11}$ and $Tx_{12}$ may transmit two radio waves corresponding to two transmission signals at the same time with different frequencies or coding schemes.

Central MIMO antennas $r_{12}$ to $r_{17}$ of MIMO antennas, except for $r_{11}$ and $r_{18}$ at both ends of the MIMO antennas to $r_{11}$ to $r_{18}$, are arranged in the direction along the X-axis at half of the second distance Dr. In other words, they are arranged at the distance of the approximately half-wavelength d. The MIMO antenna $r_{11}$ at the first end is located at the second distance Dr from the nearest MIMO antenna $r_{12}$. The MIMO antenna $r_{18}$ at the second end is located at the second distance Dr from the nearest MIMO antenna $r_{17}$. That is, the distances between two adjacent, antennas of the MIMO antennas $r_{11}$ to $r_{18}$ are Dr (=2d), d, d, d, d, d, and Dr. The MIMO array antenna 22a including MIMO antennas $r_{11}$ to $r_{18}$ has an antenna interval longer than the approximately half-wavelength. Therefore, grating lobes and side lobes are created in the MIMO array antenna 22a. On the other hand, when a MIMO array antenna is formed of only the MIMO antennas $r_{12}$ to $r_{17}$ in the middle of the MIMO array antenna 22a, no grating lobe and side lobe are created since the MIMO array antenna has an antenna interval of the approximately half-wavelength. However, a total of six antennas including two transmission antennas and four reception antennas are used to form six MIMO antennas. Therefore, the formation efficiency of the MIMO array antenna is poor.

At the second sub-antenna 10b, radio waves transmitted from the transmission antenna $Tx_{21}$ and reflected at the target are received by the reception antennas $Rx_{21}$, $Rx_{22}$, $Rx_{23}$, $Rx_{24}$, MIMO antennas $r_{21}$, $r_{22}$, $r_{24}$, and $r_{26}$ are formed in the direction along the X-axis at the second distance Dr. The phase of the MIMO antenna r21 corresponds to the phase of the transmission antenna $Tx_{21}$.

Similarly, when the radio waves transmitted from the transmission antenna $Tx_{22}$ reflected at the target are received by the receive antenna $Rx_{21}$, $Rx_{22}$, $Rx_{23}$, $Rx_{24}$ MIMO antennas $r_{23}$, $r_{25}$, $r_{27}$, and $r_{28}$ are formed in the direction along the X-axis, arranged at the second distance Dr. The phase of the MIMO antenna $r_{21}$ corresponds to the phase of the transmission antenna $Tx_{22}$. The transmission antennas $Tx_{21}$ and $Tx_{22}$ are driven in a time-division manner and transmit two radio waves corresponding to two transmission signals at different times. The time-division drive avoids interference between the two transmission signals. Alternatively, the transmission antennas $Tx_{21}$ and $Tx_{22}$ may transmit two radio waves corresponding to two transmission signals at the same time with different frequencies or coding schemes.

Central MIMO antennas $r_{22}$ to $r_{27}$ of MIMO antennas, except for $r_{21}$ and $r_{28}$ at both ends of the MIMO antennas $r_{21}$ to $r_{28}$, are arranged in the direction along the X-axis at half of the second distance Dr. In other words, they are arranged at the distance of the approximately half-wavelength d. The MIMO antenna $r_{21}$ at the first end is arranged at the second distance Dr from the nearest MIMO antenna $r_{22}$. The MIMO antenna $r_{28}$ at the second end is arranged at the second distance Dr from the nearest MIMO antenna $r_{27}$. That is, the distances between two adjacent antennas of the MIMO antennas $r_{21}$ to $r_{28}$ are Dr (=2d), d, d, d, d, d, and Dr. The MIMO array antenna 22b including MIMO antennas $r_{21}$ to $r_{28}$ has an antenna interval longer than approximately the half-wavelength. Therefore, grating lobes and side lobes are created in the MIMO array antenna 22b. On the other hand, when a MIMO array antenna is formed of only the MIMO antennas $r_{22}$ $r_{27}$ in the middle of the MIMO array antenna 22b, no grating lobe and side lobe are created since the MIMO array antenna has an antenna interval of the approximately half-wavelength. However, a total of six antennas including two transmission antennas and four reception antennas are used to form six MIMO antennas. Therefore, the formation efficiency of the MIMO array antenna is poor.

In an embodiment, the second sub-antenna 10b is used in addition to the first sub-antenna 10a, and the MIMO array antenna 22a formed of the first sub antenna 10a and the MIMO array antenna 22b formed of the second sub-antenna 10b are combined to form the MIMO array antenna efficiently.

The distance between the first sub-antenna 10a and the second sub-antenna 10b will be described.

Consideration is given to a product of the first number Nt1 of the transmission antennas forming the first transmission array antenna 12a and the first distance Dt between the transmission antennas: (Nt1−1)×Dt, and a product of a number (Nr1−1) which is one less than the second number Nr1 of the reception antennas forming the first reception array antenna 14a and the second distance Dr between the reception antennas: (Nr1−1)×Dr. According to the case shown in FIG. 1, (Nt1−1)×Dt=3d, (Nr1−1)×Dr=6d, and (Nt1−1)×Dt<(Nr1−1)×Dr.

As shown in FIG. 1, when (Nt1−1)×Dt<(Nr1−1)×Dr, a distance D1 between a transmission antenna $Tx_{12}$ of the transmission antennas forming the first transmission array antenna 12a and a transmission antenna $Tx_{21}$ of the transmission antennas forming the second transmission array antenna 12b is Dr×(Nr1−1)−d (−5). The transmission antenna $Tx_{12}$ is closest to the second transmission array antenna 12b and the transmission antenna $Tx_{21}$ is closest to the first transmission array antenna 12a.

Note that an orientation along the X-axis direction from the first transmission array antenna 12a to the second transmission array antenna 12b is +X direction, and the coordinates along the X-axis direction of the center of each antenna are x coordinates. A distance between the reception antenna $Rx_{14}$ the reception antennas forming the first reception array antenna 14a and the transmission antenna $Tx_{21}$ of the transmission antennas forming the second transmission array antenna 12b is less than a distance between the reception antenna $Rx_{21}$ of the reception antennas forming the second reception array antenna $Tx_{12}$ and the transmission antenna $Tx_{12}$ forming the transmission antennas forming the first transmission array antenna 12a. The reception antenna $Rx_{14}$ is closest to the second reception array antenna 14b and the transmission antenna $Tx_{21}$ is closest to the first transmission array antenna 12a. The reception antenna $Rx_{21}$ is closest to the first reception antenna 14a and the transmission antenna $Tx_{21}$ closest to the second transmission array antenna 12b. When this relationship is reversed, a distance D1 between the transmission antenna $Tx_{12}$ of the transmission antennas forming the first transmission array antenna 12a and the transmission antenna $Tx_{21}$ of the transmission antennas forming the second transmission array antenna 12b is Dr×(Nr2−1)−d. The transmission antenna $Tx_{12}$ is closest to the second transmission array antenna 12b and the transmission antenna $Tx_{21}$ is closest to the first transmission array antenna 12a.

Distance D2 between the reception antenna $Rx_{14}$ of the reception antennas forming the first reception array antenna 14a and the reception antenna $Rx_{21}$ of the reception antennas forming the second array antenna 14b is Dr (=2d). The reception antenna $R_{14}$ is closest to the second reception array antenna 14b and the reception antenna $Rx_{21}$ is closest to the first reception array antenna 14a.

Therefore, the phase of the MIMO antenna r21 at one end of the second MIMO array antenna 22b corresponds to the phase of a midpoint of the MIMO antennas $r_{17}$ and $r_{18}$ in the first MIMO array antenna 22a. The phase of the MIMO antenna $r_{18}$ at one end of the first MIMO array antenna 22a corresponds to the phase of a midpoint of the MIMO antennas $r_{21}$ and $r_{22}$ in the second MIMO array antenna 22b. Thus, the first MIMO array antenna 22a and the second MIMO array antenna 22b form the MIMO array antenna 24 including sixteen MIMO antennas $r_{11}$ to $r_{18}$ and $r_{21}$ to $r_{28}$ arranged in the direction along the X-axis.

The MIMO antennas $r_{12}$ to and $r_{18}$ to $r_{27}$, except for the MIMO antennas $r_{11}$ and $r_{28}$ at both ends of the MIMO array antenna 24 are arranged at half of the second distance Dr, i.e., the approximately half-wavelength d. The MIMO antenna $r_{11}$ at the first, end is arranged at the second distance Dr from the nearest MIMO antenna $r_{12}$. The MIMO antenna $r_{28}$ at the second end is arranged at the second distance Dr from the nearest MIMO antenna $r_{27}$. That is, the distances between two adjacent antennas of the MIMO antennas $r_{11}$ to $r_{28}$ are Dr(=2d), d, d, d, d, d, d, d, d, d, d, d, d, and Dr. The MIMO array antenna 24 including MIMO antennas $r_{11}$ to $r_{28}$ has an antenna interval longer than the approximately half-wavelength. Therefore, grating lobes and side lobes are created in the MIMO array antenna 24. On the other hand, when a MIMO array antenna is formed of the MIMO antennas $r_{12}$ to $r_{27}$ at the middle of the MIMO array antenna 24, no grating lobe and side lobe are created since the MIMO array antenna has an antenna interval of the approximately half-wavelength. Since fourteen MIMO antennas $r_{12}$ to $r_{27}$ are formed of a total, of twelve antennas including four transmission antennas and eight reception antennas, the formation efficiency of the MIMO array antenna can be improved as compared to a case where the first sub-antenna 10a or the second sub-antenna 10b are used alone.

Contrary to the case of FIG. 1, when (Nt1−1)×Dt>(Nr1−1)×Dr, the distance D1 between a transmission antenna $Tx_{12}$ the transmission antennas forming the first transmission array antenna 12a and a transmission antenna $Tx_{21}$ of the transmission antennas forming the second transmission array antenna 12b is Dt. The transmission antenna $Tx_{12}$ closest to the second transmission array antenna 12b and the transmission antenna $Tx_{21}$ is closest to the first transmission array antenna 12a. The distance D2 between the reception antenna $Rx_{14}$ of the reception antennas forming the first reception array antenna 14a and the reception antenna $Rx_{21}$ of the reception antennas forming the second array antenna 14b is Dt×(Nt1−1)−d. The reception antenna $Rx_{14}$ is closest to the second reception array antenna 14b and the reception antenna $Rx_{21}$ is closest, to the first reception array antenna 14a.

When the distance between the reception antenna $Rx_{14}$ of the reception antennas forming the first reception array antenna 14a, which is closest to the second reception array antenna 14b and the transmission antenna $Tx_{21}$ of the transmission antennas forming the second transmission array antenna 12b, which is closest to the first transmission array antenna 12a, is greater than the distance between the reception antenna $Rx_{21}$ of the reception antennas forming the second reception array antenna 14b, which is closest to the first reception antenna 14a, and the transmission antenna $Tx_{12}$ of the transmission antennas forming the first transmission array antenna 12a, which is closest to the second transmission array antenna 12b, D2=Dt×(Nt2−1)−d.

Note that, when (Nt1−1)×Dt=(Nr1−1)×Dr, the distance D1 between the transmission antenna $Tx_{12}$ of the transmission antennas forming the first transmission array antenna 12a, which is closest to the second transmission array antenna 12b, and the transmission antenna $Tx_{21}$ of the transmission antennas forming the second transmission array antenna 12b, which is closest to the first transmission array antenna 12a, is Dr×(Nr1−1)−d. Furthermore, distance D2 between the reception antenna $Rx_{14}$ of the reception antennas terming the first reception array antenna 14a, which is closest to the second reception array antenna 14b, and the reception antenna $Rx_{21}$ of the reception antennas forming the second array antenna 14b, which is closest to the first reception array antenna 14a, is Dt×(Nt1−1)−d.

FIGS. 2A, 2B, 2C, and 3 are examples of implementation of the antenna device according to the first embodiment.

According to the first embodiment, the first transmission array antenna 12a and the second transmission array antenna 12b are arranged with the distance D1 in a certain direction, and the first reception array antenna 14a and the second reception array antenna 14b are arranged with the distance D2 in the same direction. Various implementations are achievable.

For example, as shown in FIG. 1, the first and the second transmission array antennas 12a and 12b are arranged in the first direction. The first and the second reception array antennas 14a and 14b are arranged in the second direction parallel to the first direction. The reception array antennas 14a and 14b may be arranged such that the phase of the transmission antenna $Tx_{11}$ of the first transmission array antenna 12a in the X-axis direction is equal to the phase of the reception antenna $Rx_{11}$ of the first reception array antenna 14a in the X-axis direction. In that case, the phase of the transmission antenna $Tx_{21}$ of the second transmission array antenna 12b in the X-axis direction is equal to the phase of the reception antenna $Rx_{21}$ the second reception array antenna 14b.

Figure 2A:
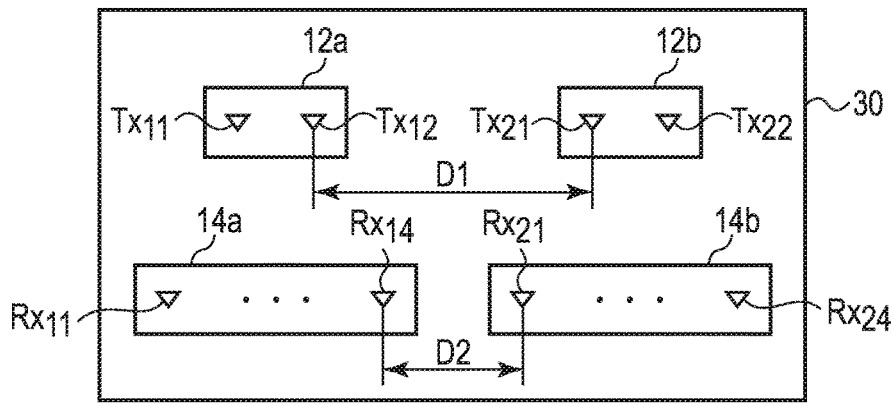
FIGS. 2A, 2B, and 2C illustrate examples of the arrangement of the antenna device according to the first embodiment.

FIG. 2A shews an arrangement example in which the first transmission array antenna 12a and the second transmission array antenna 12b are arranged in the first direction, the first reception array antenna 14a and the second reception array antenna 14b are arranged in the second direction parallel to the first direction, and the phase of the leftmost transmission antenna $Tx_{11}$ of the first transmission array antenna 12a in the X-axis direction is not equal to the phase of the leftmost reception antenna $Rx_{11}$ of the first reception array antenna 14d in the X-axis direction.

In that case, on a single substrate 30, the first and second transmission array antennas 12a and 12b and the first and second reception array antennas 14a and 14b are arranged. A distance between the rightmost transmission antenna $Tx_{12}$ of the first transmission array antenna 12a and the leftmost transmission antenna $Tx_{21}$ of the second transmission array antenna 12b is D1 and a distance between the rightmost reception antenna $Rx_{14}$ of the first reception array antenna 14a and the leftmost reception antenna $Rx_{21}$ of the second reception array antenna 14b is D2. The first and second array antennas 12a and 12b and the first, and second array antennas 14a and 14b may be arbitrarily arranged on several substrates instead of the single substrate 30.

Figure 2B:
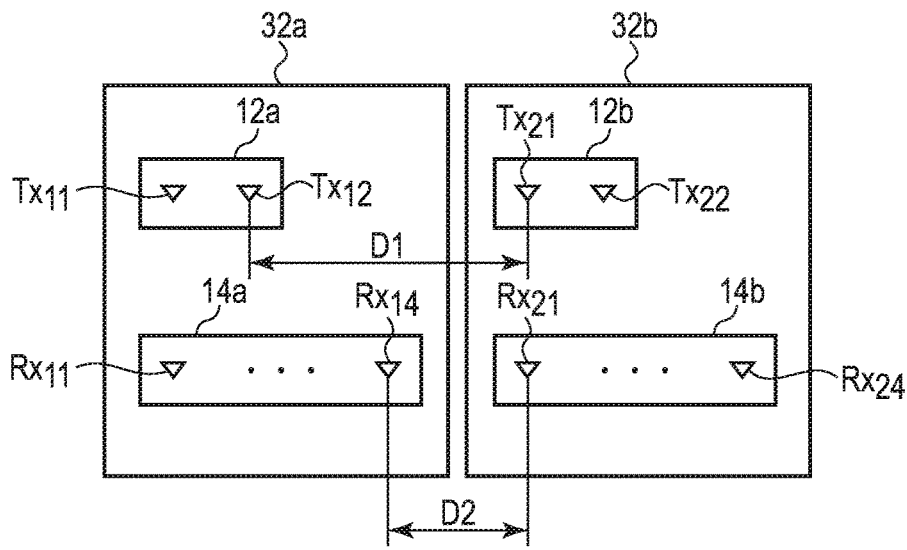

FIG. 2B shows an arrangement example in which the first and the second transmission array antennas 12a and 12b and the first and second reception array antennas 14a and 14b are arranged as in the example of FIG. 1. FIG. 2B shows, unlike FIG. 2A, an example in which substrates 32a and 32b are used for the first and second sub-antennas 10a and 10b instead of the signal substrate 32. That is, the first transmission array antenna 12a and the first reception array antenna 14a are arranged on the substrate 32a, and the second transmission array antenna 12b and the second reception array antenna 14b are arranged on the substrate 32b.

Figure 2C:
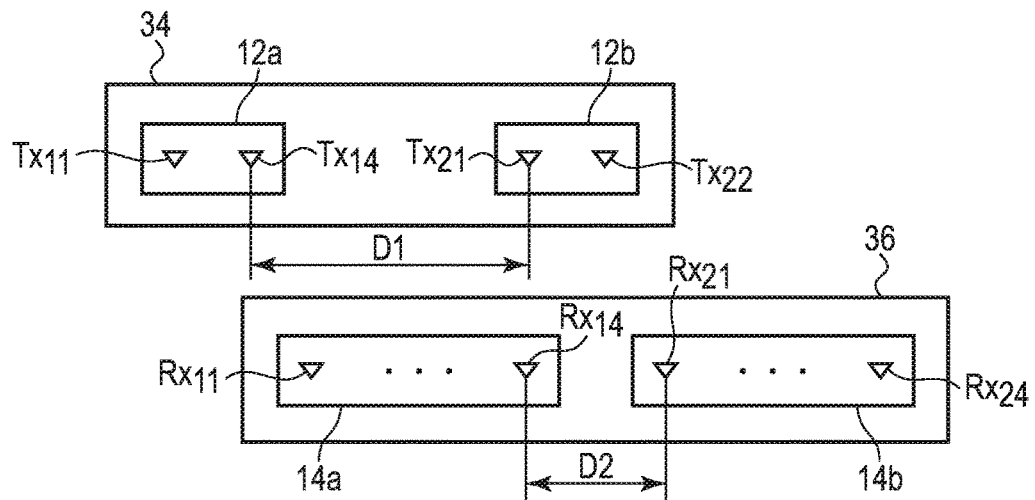

FIG. 2C shows an example where, two substrates are used in the same manner as in FIG. 2B. Here, the first and second transmission array antennas 12a and 12b are disposed on the substrate 34, and the first and second reception array antennas 14a and 14b are placed on the substrate 36. The X-axis position of the substrate 34 and the substrate 36 may be shifted by any amount. The Y-axis position of the substrate 34 and the substrate 36 may be shifted by any amount.

In addition, although this is not shown, the first and second transmission array antennas 12a and 12b and the first, and second reception array antennas 14a and 14b may be formed on four substrates, respectively.

FIG. 3 shows an example in which the first transmission array antennas 12a and 12b are arranged in the first direction and the first reception array antennas 14a and 14b are arranged in the first direction. In FIG. 3, as in FIG. 2C, the first and second transmission array antennas 12a and 12b are arranged on the substrate 34, and the first and second reception array antennas 14a and 14b are arranged on the substrate 36. However, as in FIG. 2A, the first and second transmission array antennas 12a, 12b and the first and second reception array antennas 14a and 14b may be placed on a single substrate, instead of the two substrates 34 and 36.

FIG. 4 is a block diagram illustrating an example of a circuit configuration of the antenna device according to the first embodiment.

The first and second transmission array antennas 12a and 12b are connected to first and second transmission circuits 56a and 56b, respectively. The first and second reception antennas 14a and 14b are connected to first and second reception circuits 62a and 62b, respectively. First and second transmission signals output from a transmission signal generation circuit 52 are transmitted through D/A converters 54a and 54b, respectively and are input to the first and second transmission circuits 56a and 56b, respectively.

The transmission signal generation circuit 52 generates the first and second transmission signals of the baseband frequency. The transmission signal generation circuit 52 performs a beamforming process. The first and second transmission circuits 56a and 56b performs transmission processes such as amplification, and frequency convert, and the like to the input signal of the baseband frequency. The first and second transmission signals of the radio frequency are supplied to the first and second transmission array antennas 12a and 12b, respectively. A plurality of transmission antennas forming the first and second transmission array antennas 12a and 12b irradiate the first and second transmission signals as radio waves to a target 60 in a desired direction.

The first and second reception array antennas 14a and 14b receive the radio waves reflected from the target 40. A plurality of reception antennas forming the first and second reception array antennas 14a and 14b supply the reception signals of the radio frequency to the first and second reception circuits 62a and 62b. The first and second reception circuits 62a and 62b perform the reception process such as amplification, frequency conversion, and the like to the input signals of radio frequency. The reception signals of baseband frequency are supplied to a reception processor 66 via A/D converter 64a and 64b. The reception processor 66 performs the beamforming process.

A controller 70 controls generation of the first and second transmission signals by the transmission signal generation circuit 52, transmission of the signals by the first and second transmission circuits 56a and 56b, and reception of the signals by the first and second transmission circuits 62a and 62b. When the controller 70 drives them by a time-division manner, the controller 70 controls them such that the transmission signal generation circuits 52 generates he first and second transmission signals at different timings, the first and second transmission circuits 56a and 56b transmit the radio waves corresponding to the first and second transmission signals to the target 60 at different timings, and the first and second reception circuits 62a and 62b receive reflected radio waves from the target 60 at different timings.

As a result, the radio waves corresponding to the first transmission signal are transmitted from the transmission antenna $Tx_{11}$ to the target 60, and the radio waves reflected at the target 60 are received by the reception antennas $Rx_{11}$ to $Rx_{14}$ of the reception array antenna 14a, and the first reception signal output from the reception antennas $Rx_{11}$ to $Rx_{14}$ is input to the first reception circuit 62a. The radio waves corresponding to the first transmission signal are then transmitted from the transmission antenna $Tx_{21}$ to the target 60, and the radio waves reflected at the target 60 are received by the reception antennas $Rx_{11}$ to $Rx_{14}$ of the reception array antenna 14a. The first reception signal output from the reception antennas $Rx_{11}$ to $Rx_{14}$ input to the first reception circuit 62a. Thus, the first reception circuit 62a outputs the reception signal of the first MIMO array antenna 22a.

Next, the radio waves corresponding to the second transmission signal are transmitted from the transmission antenna $Tx_{21}$ to the target 60, and the radio waves reflected at the target 60 are received by the reception antennas $Rx_{21}$ to $Rx_{24}$ of the reception array antenna 14b, and the second reception signal output from the reception antennas $Rx_{21}$ to $Rx_{24}$ is input to the second reception circuit 62b. The radio waves corresponding to the second transmission signal are then transmitted from the transmission antenna $Tx_{22}$ to the target 60, and the radio waves reflected by the target 60 are received by the antennas $Rx_{21}$ to $Rx_{24}$ of the reception array antenna 14b. The second reception signal output from the reception antenna $Rx_{21}$ to $Rx_{24}$ is input to the second reception circuit 62b. Thus, the second reception circuit 62b outputs the reception signal of the second MIMO array antenna 22b.

The controller 70 may perform frequency-division or code-division drive instead of time-division drive of generating the first and second transmission signals by the transmission signal generation circuit. 52, transmitting the first and the second transmission signals by the first and the second transmission circuits 56a and 56b, and receiving the first and the second reception signals by the first and the second reception circuits 62a and 62b. The first and second transmission circuits 56a and 56b require a local oscillator when up-converting the baseband frequency signal to the radio frequency signal, and the first and second reception circuits 62a and 62b require a local oscillator when down-converting the radio frequency signal to the baseband frequency signal. The first and second transmission circuits 56a and 56b and the first and second reception circuits 62a and 62b may not include the local oscillator, and only the controller 70 may be equipped with the local oscillator.

The reception processor 66 may process the first and second reception signals respectively output from the first and second reception circuits 62a and 62b. The reception processor 66, fox example, inputs the reception signal of the MIMO array antenna 24, and constructs a MIMO array antenna with the MIMO antennas $r_{12}$ to $r_{27}$ at the middle of the MIMO array antenna 24 spaced at the distance of the approximately half-wavelength. Note that, when the grating lobes and side lobes do not deteriorate a quality of affect communications, all MIMO antenna r11 to r28 may be used to structure the MIMO array antenna 74.

In addition, the reception processor 66 may generate reception signals of mere virtual antennas from the reception signals of the MIMO array antenna to form a virtual array antenna of the virtual antennas which are more than the actual antennas. An example of such an operation to construct the virtual antenna is KR (Khatri-Rao) transformation; an example of the KR transformation is described in JP 2020-038014. The KR transformation utilizes the non-overlapping elements of the correlation matrix of the reception signal and recalculates the extended correlation matrix.

The transmission signal generation circuit 52, controller 70, and reception processor 66 are digital signal processing circuits and may be structured by general-purpose ICs. Since the number of antennas to which general-purpose ICs can be connected is limited, an array antenna with a large number of antennas may not be used. However, a MIMO array antenna including more than the number of transmission antennas and reception antennas can be formed, and thus, general-purpose ICs may be used to perform transmission and reception processing of the MIMO array antenna.

Figure 5:
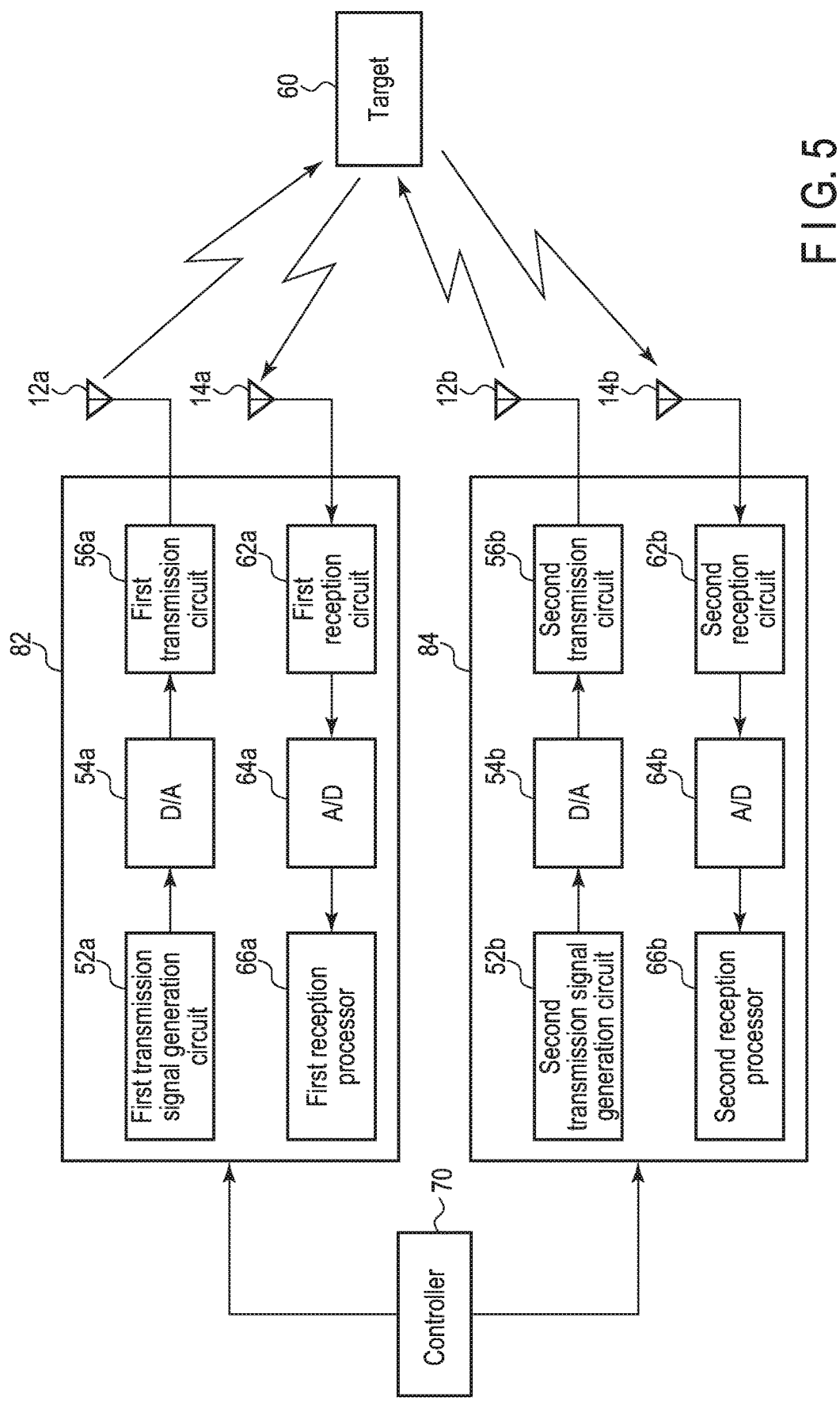
FIG. 5 is a block diagram showing another example of the circuit configuration of the antenna device according to the first embodiment.

FIG. 5 is a block diagram showing another example of a circuit configuration of the antenna device according to the first embodiment. This example includes two transmitter/receiver devices 82 and 84. Each of the transmitter/receiver devices 82 and 34 is an integrated circuit.

To the first, transmitter/receiver device 82, the first transmission array antenna 12a and the first reception array antenna 14a are connected. The first transmission circuit 56a is connected to the first transmission array antenna 12a. The first reception circuit 62a is connected to the first reception array antenna 14a. The first transmission signal output from the first transmission signal generation circuit 52a is input to the first transmission circuit 56a. The first reception array antenna 14a receives the radio waves reflected from the target 40. Each of the reception antennas forming the first reception array antenna 14a supplies the radio frequency reception signal to the first reception circuit 62a. The first reception circuit 62a performs reception processing such as amplification and frequency conversion on the radio frequency input signals and supplies the reception signals of the band frequency to the first reception processer 66a via the A/D converter 64a. The first reception processer 66a also performs the beamforming process. The second transmitter/receiver device 84 is structured in the same way as the first transmitter/receiver device 82.

The controller 70 controls the first and second transmitter/receiver devices 32 and 84 such that one of them is a master and the other is a slave in order to prevent the transmission signals from the array antennas 12a and 12b from being emitted simultaneously.

As explained above, according to the first embodiment, two MIMO array antennas arranged at the distance longer than the approximately half-wavelength are combined at the ends, and thus, the number of antennas arranged at the distance of the approximately half-wavelength can be increased and the MIMO array antennas can be formed efficiently.

Second Embodiment

FIG. 6 shews an example of an antenna device according to a second embodiment. The second embodiment relates to a modification of the first embodiment. According to the first embodiment, the transmission array antenna of each of the sub-antennas 10a and 10b includes a single linear array antenna. According to the second embodiment, the transmission array antenna of each of the sub-antennas 10a and 10b includes multiple linear array antennas. FIG. 6 shows an example in which the transmission array antenna of each of the sub-antennas 10a and 10b includes two linear array antennas.

That is, the first sub-antenna 10a includes the first transmission array antenna 12a and a third transmission array antenna 16a. The third transmission array antenna 16a is structured in the same manner as the first transmission array antenna 12a and includes third transmission antennas $Tx_{13}$ and $Tx_{14}$ of the first number Nt1(=2) arranged at the first distance Dt. The third transmission antennas $Tx_{13}$ and $Tx_{14}$ are arranged in a third direction parallel to the first direction.

The second sub-antenna 10b includes the second transmission array antenna 12b and a fourth transmission array antenna 16b. The fourth transmission array antenna 16b is structured in the same manner as the second transmission array antenna 12b. The fourth transmission array antenna 16b includes fourth transmission antennas $Tx_{23}$ and $Tx_{24}$ of a third number Nt2(=2). Each of the fourth transmission antennas $Tx_{23}$ and $Tx_{24}$ is arranged with the first distance Dt in the third direction.

For example, the third transmission array antenna 16a and the fourth transmission array antenna 16b are on a third straight line along the third direction. Second and third straight lines are separated in the Y-axis direction by a distance Y2.

As shown in FIG. 6, when (Nt1−1)×Dt≤(Nr1−1)×Dr, the distance D1 between the transmission antenna $Tx_{14}$ of the transmission antennas forming the third transmission array antenna 16a, which is closest to the fourth transmission array antenna 16b, and the transmission antenna $Tx_{23}$ of the transmission antennas forming the fourth transmission array antenna 16b, which is closest to the third transmission array antenna 16a, is Dr×(Nr1−1)−d (=5d).

The other structure is the same as the first embodiment as in FIG. 1.

According to the second embodiment, in addition to the MIMO array antenna 24, similarly to the MIMO array antenna 22a, a first sub-MIMO array antenna including MIMO antennas $r_{31}$ to $r_{38}$ is formed of a combination of the third transmission array antenna 16a and the first reception array antenna 14a. Similarly to the MIMO array antenna 22b, a second sub-MIMO array antenna including MIMO antennas $r_{41}$ to $r_{48}$ is formed of a combination of the fourth transmission array antenna 16b and the second reception array antenna 14b. A second MIMO array antenna 26 including the MIMO antennas $r_{31}$ to $r_{48}$ is formed of a combination of the first sub-MIMO and second sub-MIMO array antennas.

When the number of the transmission array antennas increases to three or more, the number of MIMO array antennas formed also increase to three or more.

Third Embodiment

Figure 7:
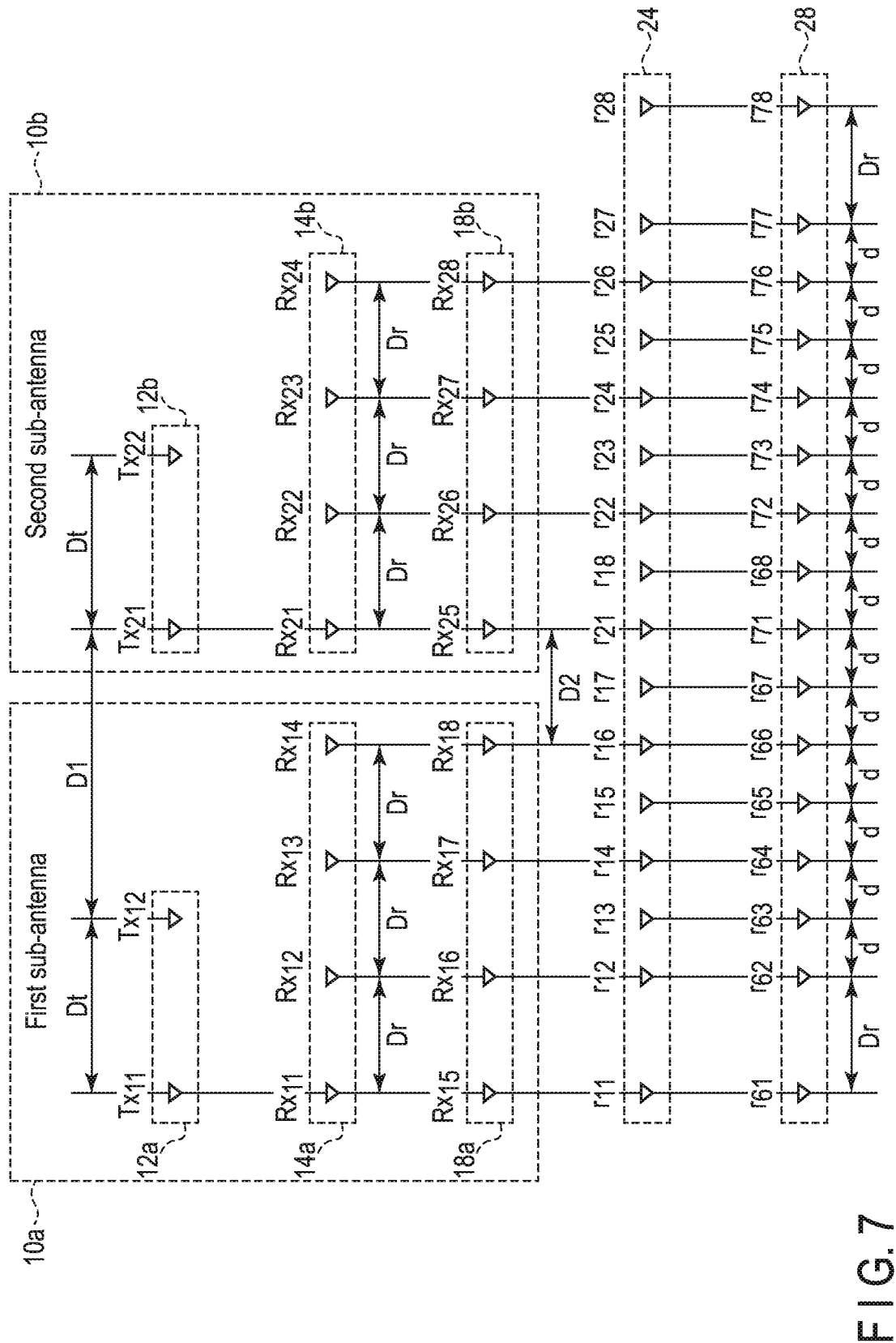
FIG. 7 illustrates an example of an antenna device according to a third embodiment.

FIG. 1 shows an example of an antenna device according to a third embodiment. The third embodiment relates to a modification of the first embodiment. According to the first embodiment, the reception array antenna of each of the sub-antennas 10a and 10b includes a single linear array antenna. According to the third embodiment, the reception array antenna of each of the sub-antennas 10a and 10b includes multiple linear array antennas. FIG. 7 shows an example in which the reception array antenna of each of the sub-antennas 10a and 10b includes two linear array antennas.

That is, the first sub-antenna 10a includes the first reception array antenna 14a and a third reception array antenna 18a. The third reception array antenna 18a is structured in the same manner as the first reception array antenna 14a. The third reception array antenna 18a includes third reception antenna $Rx_{15}$, $Rx_{16}$, $Rx_{17}$, and $Rx_{18}$ of the second number Nr1(=4) arranged at the second distance Dr. The third reception antenna $Rx_{15}$, $Rx_{16}$, $Rx_{17}$, and $Rx_{18}$ are arranged in a fourth direction which is parallel to the second direction.

The second sub-antenna 10b includes the second reception array antenna 14b and a fourth reception array antenna 18b. The fourth reception array antenna 19b is structured in the same manner as the second reception array antenna 14b. The fourth reception array antenna includes fourth reception antennas $Rx_{25}$, $Rx_{26}$, $Rx_{27}$, and $Rx_{28}$ of a fourth number Nr2(=4). Each of the fourth reception antennas $Rx_{25}$, $Rx_{26}$, $Rx_{27}$, and $Rx_{28}$ is arranged with the second distance Dr in the fourth direction.

As in FIG. 7, when (Nt1−1)×Dt≤(Nr1−1)×Dr, a distance between the antenna $Rx_{18}$ of the reception antennas forming the third reception array antenna 18a, which is closest to the fourth reception array antenna 18b, and the antenna $Rx_{25}$ the reception antennas forming the fourth reception array antenna 18b, which is closest to the third reception array antenna 18a, is Dr.

The other structure is the same as the first embodiment of FIG. 1.

According to the third embodiment, in addition to the MIMO array antenna 24, similarly to the MIMO array antenna 22a, a first sub-MIMO array antenna including MIMO antennas $r_{61}$ to $r_{68}$ is formed of a combination of the first transmission array antenna 12a and the third reception array antenna 18a. Similarly to the MIMO array antenna 22b, a second sub-MIMO array antenna including MIMO antennas $r_{71}$ to $r_{78}$ is formed of a combination of the second transmission array antenna 12b and the fourth reception array antenna 18b. A second MIMO array antenna 28 including the MIMO antennas $r_{61}$ to $r_{78}$ is formed of a combination of the first sub-MIMO and second sub-MIMO array antennas.

When the number of the reception array antennas increases to three or more, the number of MIMO array antennas formed also increase to three or more.

Furthermore, although not shown, a combination of the second and third embodiments may be adopted. That is, both the transmission array antenna and the reception array antenna may include multiple rows of linear array antennas.

Fourth Embodiment

Figure 8:
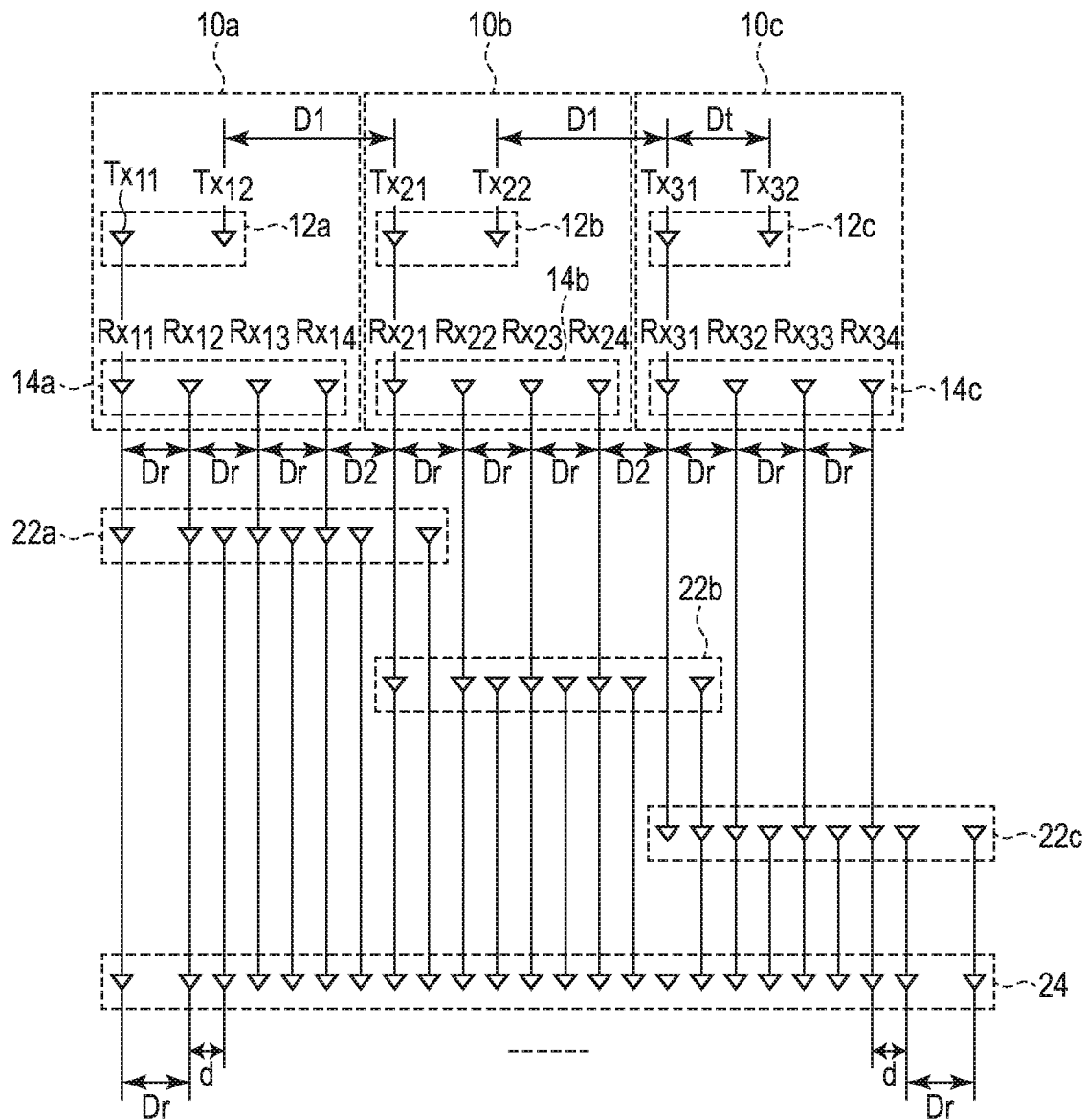
FIG. 8 illustrates an example of an antenna device according to a fourth embodiment.

FIG. 8 shows an example of an antenna device according to a fourth embodiment. According to the above embodiments, a MIMO array antenna is formed of two sub-antennas; however, a MIMO array antenna may be formed of three or more sub-antennas. FIG. 8 shows an example including three sub-antennas 10a, 10b, and 10c.

The third sub-antenna 10c is structured in the same manner as the first and second sub-antennas 10a and 10b. The third sub-antenna 10c includes a third transmission array antenna 12c and a third reception array antenna 14c.

The third transmission array antenna 12c includes third transmission antennas $Tx_{31}$ and $Tx_{32}$ of a fifth number Nt3 (two in this example). The third transmission antennas $Tx_{31}$ and $Tx_{32}$ are arranged with the first distance Dt in the first direction. The third reception array antenna 14c includes third reception antennas $Rx_{31}$, $Rx_{32}$, $Rx_{33}$, and $Rx_{34}$ of a sixth number Nr3 (four in this example). Each of the third reception antennas $Rx_{31}$, $Rx_{32}$, $Rx_{33}$, and $Rx_{34}$ is arranged with the second distance Dr in the second direction.

As shown in FIG. 8, when (Nt2−1)×Dt≤Nr2×Dr, the distance D1 between the transmission antenna $Tx_{22}$ of the transmission antennas forming the second transmission array antenna 12b, which is closest to the third transmission array antenna 12c, and the transmission antenna $Tx_{31}$ of the transmission antennas forming the third transmission array antenna 12c, which is closest, to the second transmission array antenna 12b, is Dr×(Nr2−1)−d (=5).

The distance D2 between the reception antenna of the reception antennas forming the second reception array antenna 14b, which is closest, to the third reception array antenna 14c, and the reception antenna $Rx_{31}$ of the reception antennas forming the third reception array antenna 14c, which is closest to the second reception array antenna 14b, is Dr.

The other structure is the same as in the first, embodiment.

The first MIMO array antenna 22a including eight MIMO antennas is formed of the first sub-antenna 10a, the second MIMO array antenna 22b including eight MIMO antennas is formed of the second sub-antenna 10b, and a third MIMO array antenna 22c including eight MIMO antennas is formed of the third sub-antenna 10c.

The positional relationship of the sub-antennas 10b and 10c is the same as that of the sub-antennas 10a, 10b. By combining the first, second, and third MIMO array antennas 22a, 22b, and 22c, the MIMO array antenna 24 including 24 MIMO antennas is formed. The MIMO antennas at both ends of the MIMO array antenna 24 are distance from the closest antenna by the second direction Dr. The MIMO antennas at the middle, i.e., except, for the MIMO antennas in the both ends are arranged at half of the second distance Dr, i.e., at the approximately half-wavelength d.

APPLICATION EXAMPLE

An electronic device uses radio waves to generate an image of a target. Radio waves with wavelengths between 1 mm and 10 mm are called millimeter waves (EHF: Extra High Frequency). Radio waves with wavelengths from 10 mm to 100 mm are called microwaves (SHF: Super High Frequency). When using millimeter waves, the distance between the antennas that form the array antenna is a few millimeters (e.g., 2 millimeter or less). When using millimeter waves, a large number of antennas are needed because the antenna interval is small. Therefore, it is preferable to use a MIMO array antenna.

Figure 9:
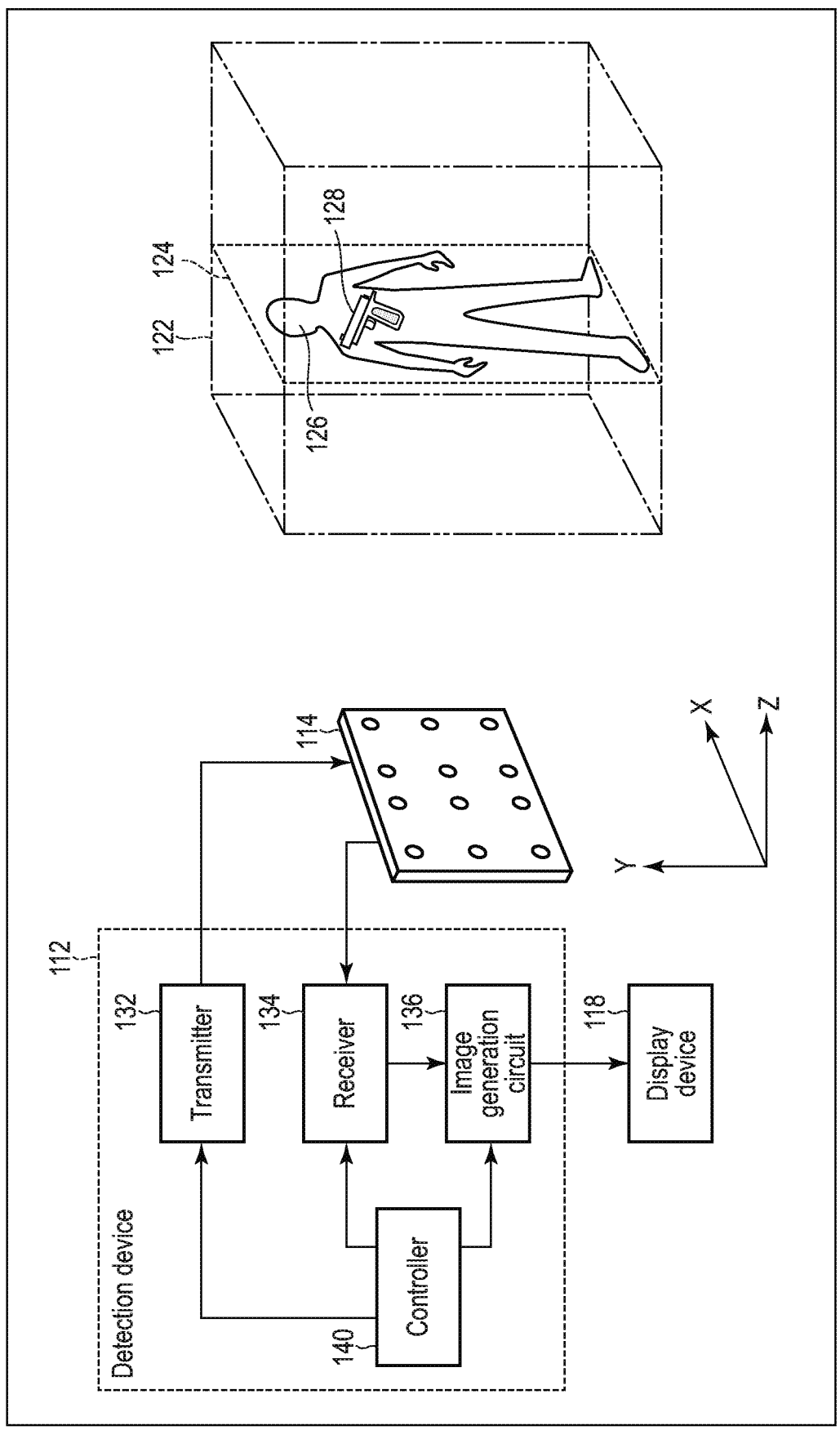
FIG. 9 illustrates an applied example of the antenna devices according to the embodiments.

The antenna device according to the above-described embodiments can be applied to such an electronic device. FIG. 9 illustrates an application of the antenna device according to the above-described embodiments. The electronic device includes an array antenna 114 that is positioned opposed to a target (e.g., a person) 126, a detection device 112 connected to the array antenna 114, and a display device 113 connected to the detection device 112. The array antenna 114 includes the transmission antenna and the reception antenna according to the embodiments. The size of the array antenna 114 corresponds to the size of the target 126. Radio waves are emitted from the array antenna 114 in the Z-axis direction orthogonal to the antenna substrate.

The detection device 112 obtains an image of the target 126 in a plane 124 which is in a three-dimensional space 122 located in the direction of the radio waves emitted from the array antenna 114. The plane 124 is parallel to the array antenna 114. The phase of the plane 124 from which the image is obtained depends on the time from transmission to reception of the radio waves. The time from transmission to reception of the radio waves is set according to the phase of a number of planes 124 in the three-dimensional space 122. By obtaining images of the planes 124 at a number of different locations, a 3D image of the target 126 can be rendered. One example of the use of this detection device 112 is body checking of persons at airports, train stations, etc.

The detection device 112 includes a transmitter 132 and a receiver 134 connected to each antenna included in the array antenna 114. The transmitters 132 or the receivers 134 may be provided corresponding to the number of the antennas, and may be connected to the antennas, respectively. The transmitters 132 or the receivers 134 may be provided to be less than the number of the antennas, and may be connected commonly to the antennas via a selector.

The transmitter 132 and the receiver 134 are controlled by a controller 140. The transmitter 132 and the receiver 134 are connected to the controller 140 by wire or wirelessly. The controller 140 controls a transmission frequency, frequency band, and transmission timing for each antenna of the transmitter 132, and controls a reception timing (time from transmission to reception) of the receiver 134 for each antenna. The reception signal of one antenna corresponds to the image signal of one pixel of the target 126. The controller 140 changes (scans) the antennas sequentially, and changes the reception timing. The radio waves emitted from the transmission antenna and reflected at the target 126 are received by the reception antenna.

The reception signal output from the receiver 134 is supplied to an image generation circuit 136, and an image signal indicative of a 3-D image of the target 126 is generated. The receiver 134 and the image generation circuit 136 are connected by wire or wirelessly. The image generation circuit 136 is also controlled by the controller 140. The image reconstruction algorithm of the image generation circuit 136 may be a time domain method, frequency domain method, or any other algorithms.

The image signal generated by the image generation circuit 136 is supplied to the display device 118 for display. By observing this image, whether or not the target 126 possesses a dangerous object (e.g., a gun) 128 can be detected. The image generation circuit 136 and the display device 118 are connected by wire or wireless.

While certain embodiments have been described, these embodiments have been presented by way of example only, and are not intended to limit, the scope of the inventions. Indeed, the novel embodiments described herein may be embodied in a variety of other forms; furthermore, various omissions, substitutions, and changes in the form of the embodiments described herein may be made without departing from the spirit of the inventions.

What is claimed is:

1. An antenna device comprising:
a first transmission array antenna including first transmission antennas of a first number, each of the first transmission antennas being arranged with a first distance in a first direction;
a first reception array antenna including first reception antennas of a second number, each of the first reception antennas being arranged with a second distance in the first direction or a second direction which is parallel to the first direction;
a second transmission array antenna including second transmission antennas of a third number, each of the second transmission antennas being arranged with the first distance in the first direction; and
a second reception array antenna including second reception antennas of a fourth number, each of the second reception antennas being arranged with the second distance in the first direction or the second direction, wherein:
a third distance between one of the first reception antennas which is closest to the second reception array antenna and one of the second transmission antennas which is closest to the first transmission array antenna is less than a fourth distance between one of the second reception antennas which is closest, to the first reception array antenna and one of the first transmission antennas which is closest to the second transmission array antenna,
an approximately half-wavelength is d,
the first distance is Dt which is an integer multiple of at least two of the approximately half-wavelength,
the first number is Nt1,
the second distance is Dr which is an integer multiple of at least two of the approximately half-wave length,
the second number is Nr1,
a fifth distance between one of the first transmission antennas which is closest to the second transmission array antenna and one of the second transmission antennas which is closest to the first transmission array antenna is Dr×(Nr1−1)−d when (Nt1−1)×Dt≤(Nr1−1)×Dr, and
a sixth distance between one of the first reception antennas which is closest to the second reception array antenna and one of the second reception antennas which is closest to the first reception array antenna is Dr×(Nt1−1)−d when (Nt1−1)×Dt>(Nr1−1)×Dr.

2. The antenna device of claim 1, wherein
the first transmission array antenna further includes third transmission antennas of the first number, each of the third transmission antennas being arranged with the first distance in the first direction or a third direction which is parallel to the first direction,
the second transmission array antenna further includes fourth transmission antennas of the third number, each of the fourth transmission antennas being arranged with the first distance in the first direction or the third direction,
a seventh distance between one of the third transmission antennas which is closest to the second transmission array antenna and one of the fourth transmission antennas which is closest to the first transmission array antenna is Dr×(Nr1−1)−d when (Nt1−1)×Dt≤(Nr1−1)×Dr, and
the seventh distance is Dr when (Nt1−1)×Dt>(Nr1−1)×Dr.

3. The antenna device of claim 1, wherein:
the first reception array antenna further includes third reception antennas of the second number, each of the third reception antennas being arranged with the second distance in the first direction or a fourth direction which is parallel to the second direction,
the second reception array antenna further includes fourth reception antennas of the fourth number, each of the fourth reception antennas being arranged with the second distance in the first direction or the fourth direction,
a ninth distance between one of the third reception antennas which is closest to the second reception array antenna and one of the fourth reception antennas which is closest to the first reception array antenna is Dr when (Nt1−1)×Dt<(Nr1−1)×Dr, and
the ninth distance is Dt×(Nr1−1)−d when (Nt1−1)×Dt>(Nr1−1)×Dr.

4. The antenna device of claim 1, further comprising a controller configured to control a transmission timing and a reception timing of the first transmission array antenna, the second transmission array antenna, the first reception array antenna, and the second reception array antenna.

5. The antenna device of claim 1, further comprising a signal processor configured to receive a reception signal from the first reception array antenna and a reception signal from the reception array antenna and to generate reception signals of antennas arranged with an approximately half-wavelength distance in the second direction.

6. The antenna device of claim 1, wherein the third number is equal to the first number.

7. The antenna device of claim 1, wherein the fourth number is equal to the second number.

8. The antenna device of claim 6, wherein the fourth number is equal to the second number.

9. An antenna device comprising:
a first transmission array antenna including first transmission antennas of a first number, each of the first transmission antennas being arranged with a first distance in a first direction;
a first reception array antenna including first reception antennas of a second number, each of the first reception antennas being arranged with a second distance in the first direction or a second direction which is parallel to the first, direction;
a second transmission array antenna including second transmission antennas of a third number, each of the second transmission antennas being arranged with the first distance in the first direction; and
a second reception array antenna including second reception antennas of a fourth number, each of the second reception antennas being arranged with the second distance in the first direction or the second direction, wherein:
an approximately half-wavelength is d, the first distance is Dt which is an integer multiple of at least two of the approximately half-wavelength,
the first number is Nt1,
the second distance is Dr which is an integer multiple of at least two of the approximately half-wavelength,
the second number is Nr1,
a third distance between one of the first reception antennas which is closest to the second reception array antenna and one of the second reception antennas which is closest to the first reception array antenna is Dr when $(Nt1-1) \times Dt \leq (Nr1-1) \times Dr$, and
a fourth distance between one of the first transmission antennas which is closest to the second transmission array antenna and one of the second transmission antennas which is closest to the first transmission array antenna is Dt when $(Nt1-1) \times Dt > (Nr1-1) \times Dr$.

10. The antenna device of claim 9, wherein:
a fifth distance between one of the first reception antennas which is closest to the second reception array antenna and one of the second transmission antennas which is closest to the first transmission array antenna is less than a sixth distance between one of the second reception antennas which is closest to the first reception array antenna and one of the first transmission antennas which is closest to the second transmission array antenna,
the fourth distance is $Dr \times (Nr1-1) - d$ when $(Nt1-1) \times Dt \leq (Nr1-1) \times Dr$, and
the third distance is $Dr \times (Nr1-1) - d$ when $(Nt1-1) \times Dt > (Nr1-1) \times Dr$.

11. The antenna device of claim 9, wherein:
the first transmission array antenna further includes third transmission antennas of the first number, each of the third transmission antennas being arranged with the first distance in the first direction or a third direction which is parallel to the first direction,
the second transmission array antenna further includes fourth transmission antennas of the third number, each of the fourth transmission antennas being arranged with the first distance in the first direction or the third direction,
a seventh distance between one of the third transmission antennas which is closest to the second transmission array antenna and one of the fourth transmission antennas which is closest to the first transmission array antenna is $Dr \times (Nr1-1) - d$ when $(Nt1-1) \times Dt \leq (Nr1-1) \times Dr$, and
the seventh distance is Dr when $(Nt1-1) \times Dt > (Nr1-1) \times Dr$.

12. The antenna device of claim 9, wherein:
the first reception array antenna further includes third reception antennas of the second number, each of the third reception antennas being arranged with the second distance in the first direction or a fourth direction which is parallel to the second direction,
the second reception array antenna further includes fourth reception antennas of the fourth number, each of the fourth reception antennas being arranged with the second distance in the first direction or the fourth direction,
a ninth distance between one of the third reception antennas which is closest to the second reception array antenna and one of the fourth reception antennas which is closest to the first reception array antenna is Dr when $(Nt1-1) \times Dt < (Nr1-1) \times Dr$, and
the ninth distance is $Dt \times (Nr1-1) - d$ when $(Nt1-1) \times Dt > (Nr1-1) \times Dr$.

13. The antenna device of claim 9, further comprising a controller configured to control a transmission timing and a reception timing of the first transmission array antenna, the second transmission array antenna, the first reception array antenna, and the second reception array antenna.

14. The antenna device of claim 9, further comprising a signal processor configured to receive a reception signal from the first reception array antenna and a reception signal from the reception array antenna and to generate reception signals of antennas arranged with an approximately half-wavelength distance in the second direction.

15. The antenna device of claim 9, wherein the third number is equal to the first number.

16. The antenna device of claim 9, wherein the fourth number is equal to the second number.

17. The antenna device of claim 15, wherein the fourth number is equal to the second number.

* * * * *